UNITED STATES PATENT OFFICE.

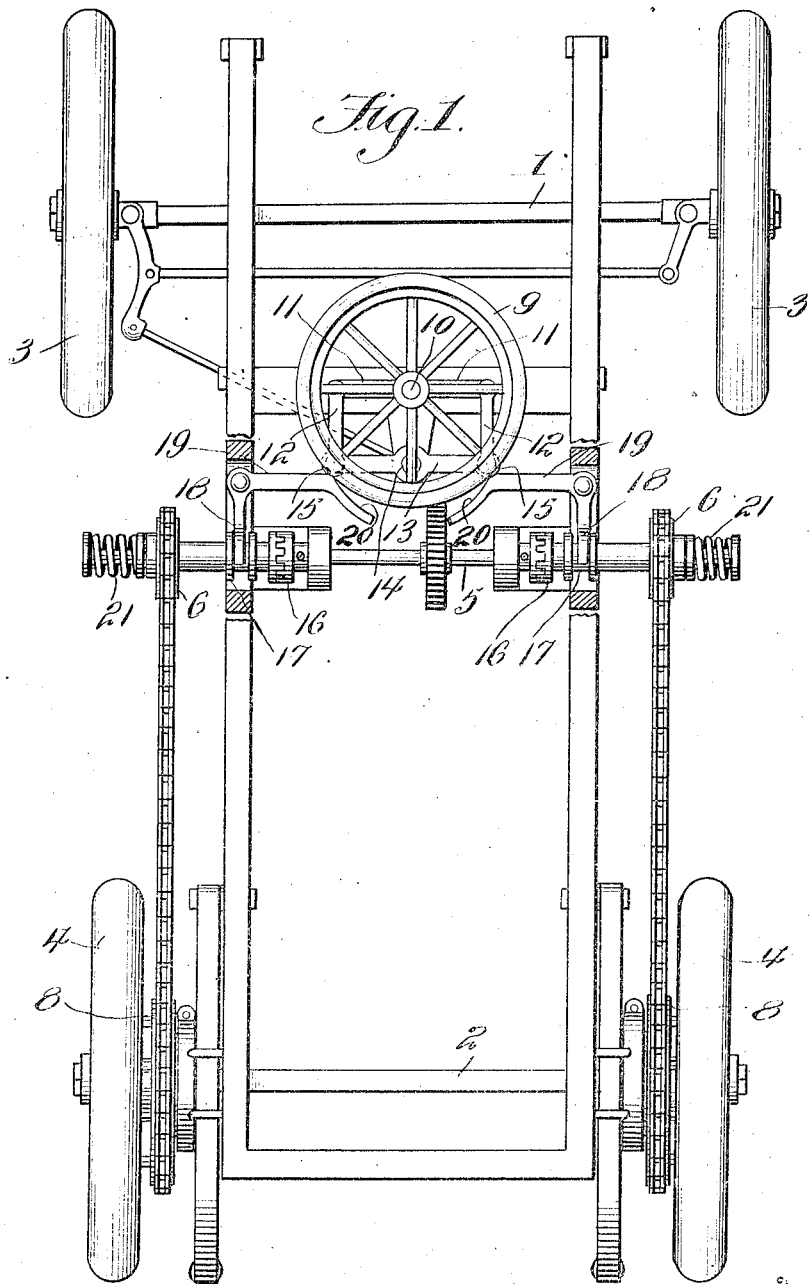

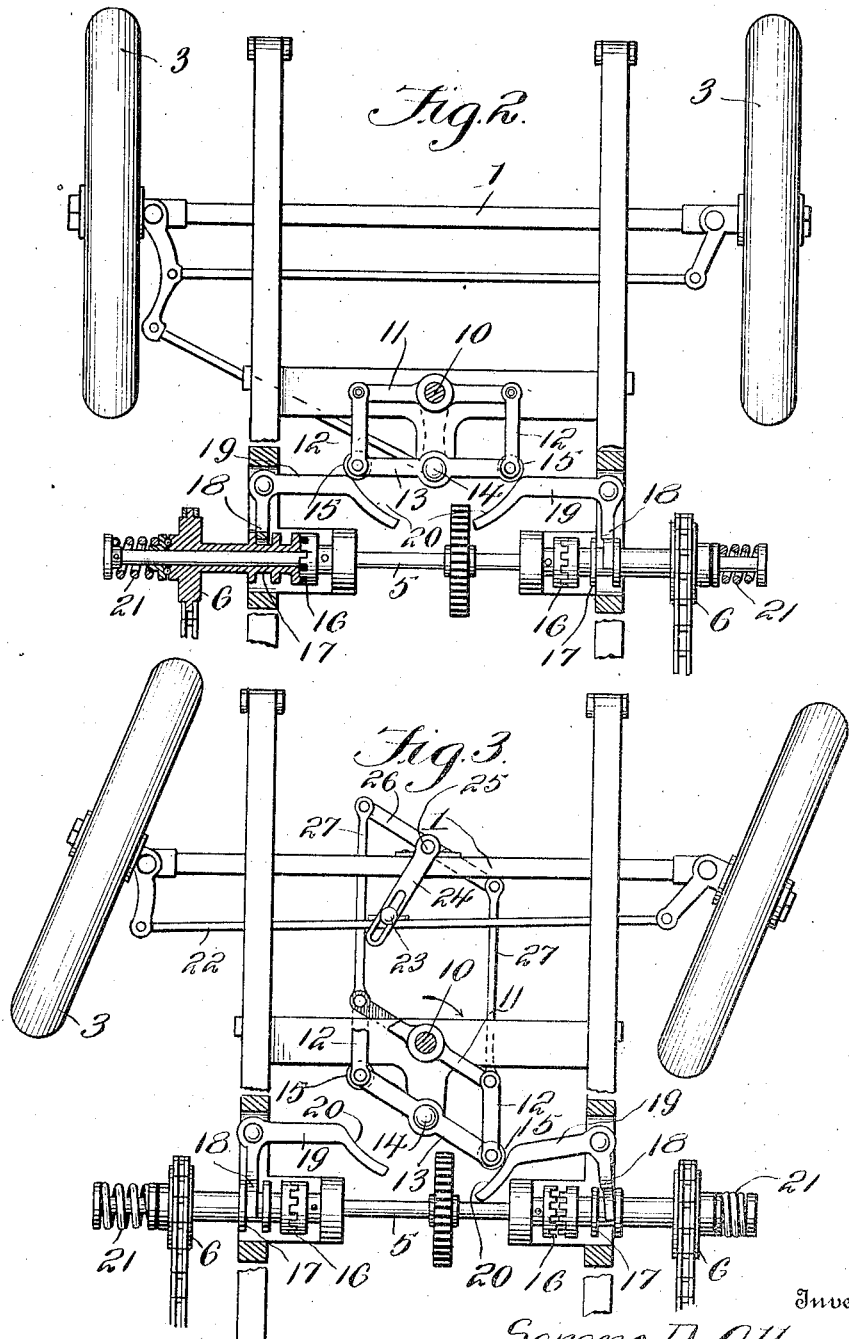

SERENO D. ALLEN, OF SAN DIEGO, CALIFORNIA.

AUTOMOBILE DRIVING-GEAR.

1,091,998. Specification of Letters Patent. Patented Mar. 31, 1914.

Application filed December 27, 1912. Serial No. 738,873.

*To all whom it may concern:*

Be it known that I, SERENO D. ALLEN, a citizen of the United States, residing at San Diego, in the county of San Diego and State of California, have invented new and useful Improvements in Automobile Driving-Gears, of which the following is a specification.

This invention relates to driving gear for automobiles, motor trucks and other mechanically propelled vehicles employing motors, the object of the invention being to provide a simple and novel form of driving mechanism whereby the differential gearing now ordinarily employed may be dispensed with, the mechanism of this invention providing for throwing out one or the other of the driving wheels of the machine, so that the outside driving wheel will remain in operation in steering the machine from a true straight line, the remaining driving wheel being left idle so as to follow its own course independently of the other which remains geared to the motor.

With the above and other objects in view, the invention consists in the construction, combination and arrangement of parts, as will be more fully described hereinafter, illustrated in the accompanying drawings and pointed out in the claims hereunto appended.

In the accompanying drawings:—Figure 1 is a plan view of the running gear of a motor driven vehicle, illustrating the general arrangement of the driving gear of this invention. Fig. 2 is a plan view on an enlarged scale of the driving shaft and steering wheel, showing the connections between the two, for a straight ahead drive. Fig. 3 is a similar view, showing the position assumed by the parts in steering in a curved path.

Referring to the drawing, 1 designates the front axle and 2 the rear axle of a motor driven vehicle, 3 designating the front wheels and 4 the rear wheels which constitute also the driving wheels of the machine. Arranged near the front of the machine is a drive shaft 5 which extends parallel to the axle 2. This driving shaft is sectional or divided and adjacent to the opposite ends thereof is provided with sprocket or belt wheels 6 from which sprocket chains or belts 7 extend rearward over corresponding wheels 8 on the driving wheels 4, thus enabling the motion of the shaft 5 to be transmitted to the rear driving wheels.

9 designates the steering wheel mounted rigidly on the steering post 10 which, in carrying out this invention is provided with oppositely extending lever arms 11 from which connecting links or rods 12 extend rearwardly to a master lever 13 fulcrumed centrally at 14 on a fixed part of the frame. At its opposite ends, the master lever 13 carries anti-friction rollers 15 adapted to come in contact with the clutch shifters hereinafter described.

The wheels 6 are provided with clutches 16 adapting them to be moved into and out of engagement with the drive shaft 5, each of said clutches being provided with a grooved collar 17 which is engaged by the forked arm 18 of a bell crank lever, the other arm 19 of which extends inward and is provided with a curved detaining extension 20, the operation of which is illustrated in Fig. 3. Springs 21 at the outer ends of the drive shaft serve to restore the clutch shifters to their normal positions and set the clutches in operation when they are released by the master lever 13, which ensues when the lever 13 extends transversely to the path of movement of the vehicle in traveling ahead in a straight line.

When the machine is proceeding ahead on a straight line, it will be observed that the rollers 15 are out of contact with both of the clutch shifters. This has the effect of maintaining both the driving wheels 4 in engagement with the drive shaft 5. As soon as the steering wheel 9 is turned to direct the vehicle to one side or the other, one of the rollers 15 comes in contact with the appropriate clutch shifter and rocks said shifter so as to throw the wheel 6 at that side of the center out of gear, allowing the belt or sprocket chain 7 to run idle. As soon as the clutch referred to is thrown out, the roller 15 travels along the curved extension 20 of said shifter thereby holding the clutch in a thrown out position until the lever 13 is restored to its straight away position, whereupon the roller 15 passes out of contact with the clutch shifter at that side of the center, allowing the spring 21 at the same side to act to throw the wheel 6 into action.

The steering mechanism for the front wheels may be controlled from the same cross head or oppositely extending lever arms 11 hereinabove described, as shown in Fig. 3. To accomplish this, the connecting rod 22, which is pivotally attached at its ends to the steering arms of the front wheels, is provided with a pin or stud 23 which works in a slot in a rearwardly extending arm 24 of a vertical stud shaft 25 mounted in suitable bearings on the front axle. Fast on this shaft 25 is a cross head or oppositely extending lever arms 26, to which are pivotally connected a pair of rearwardly extending links or rods 27, the rear ends of which are pivotally connected to the arms 11, as shown. When the steering post 10 is turned, the arms 11 swing, and by means of the rods 27 a corresponding swinging movement is imparted to the lever arms 26, and through the medium of the rearwardly extending lever arm 24, the rod 22 is moved in the direction of its length, or laterally with respect to the path of movement of the machine, thereby turning the front steering wheels 3 in a corresponding direction.

From the foregoing description, it will be seen that the use of the ordinary differential gearing is dispensed with and that as soon as the steering wheel is thrown in one direction or the other, the inside driving wheel is thrown out of gear, while the outside driving wheel is maintained in gear, the idle driving wheel turning freely and at a speed conforming to the radius of the curve being followed by the machine. As soon as the machine resumes a straight away course, both of the driving wheels 4 are again thrown into propelling engagement with the drive shaft 5.

I claim:—

1. In a driving gear for motor propelled vehicles, the combination with the machine frame, and the driving axle and wheels, of a divided motor-actuated drive shaft parallel to said axle, driving connections between the sections of said drive shaft and the driving wheels, lever arms on the steering post, clutches on said drive shaft between the side bars of the machine frame for throwing the drive shaft sections into and out of gear, a single lever operated by said lever arms, and a pair of clutch shifters both located in the path of said lever so as to be actuated thereby, one at a time.

2. In driving gear for motor propelled vehicles, the combination with the machine frame, and the driving axle and wheels, of a divided motor-actuated drive shaft parallel to said axle, driving connections between the sections of said drive shaft and the driving wheels, a single lever operated by the steering post, clutches for throwing the drive shaft sections into and out of gear, and a pair of shifters arranged within the plane of the machine frame and provided with curved extensions which coact with said lever, whereby said single lever acts on both clutch shifters one at a time and operates to first throw out a clutch and then hold the same out without further movement of said shifters while the steering shaft is being turned.

In testimony whereof I affix my signature in presence of two witnesses.

SERENO D. ALLEN.

Witnesses:
O. C. Drange,
H. E. Crane.